R. T. CARLSON.
DEVICE FOR HOLDING CRANK AND TRANSMISSION SHAFTS AND BRAKE BANDS.
APPLICATION FILED JAN. 28, 1918.
1,284,592.
Patented Nov. 12, 1918.
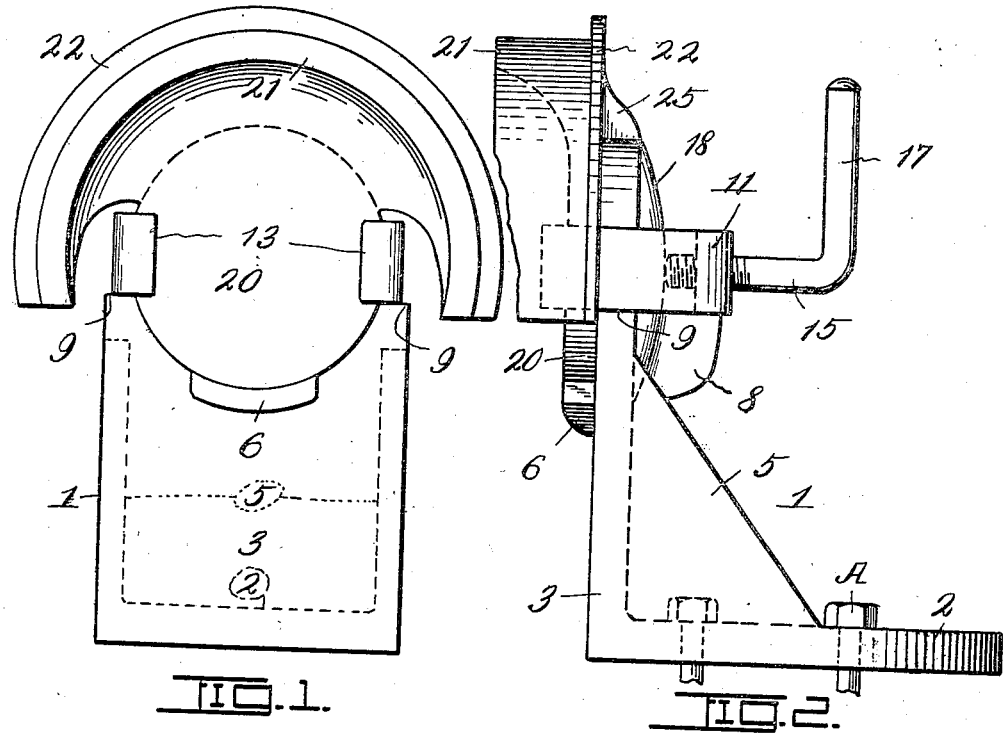
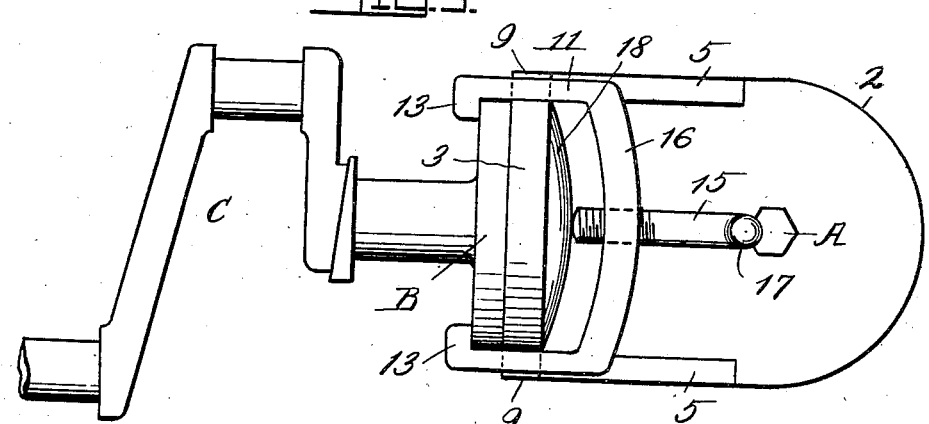
WITNESS:
Fred C. Rischen
INVENTOR.
Richard T. Carlson,
BY
F. G. Fischer,
ATTORNEY.

UNITED STATES PATENT OFFICE.

RICHARD T. CARLSON, OF ROSEDALE, KANSAS.

DEVICE FOR HOLDING CRANK AND TRANSMISSION SHAFTS AND BRAKE-BANDS.

1,284,592.  Specification of Letters Patent.  Patented Nov. 12, 1918.

Application filed January 28, 1918. Serial No. 214,073.

*To all whom it may concern:*

Be it known that I, RICHARD T. CARLSON, a citizen of the United States, residing at Rosedale, in the county of Wyandotte and State of Kansas, have invented certain new and useful Improvements in Devices for Holding Crank and Transmission Shafts and Brake-Bands, of which the following is a specification.

My invention relates to improvements in devices for holding crank shafts, transmission shafts, brake-bands, etc., and one object is to provide a simple, inexpensive and efficient device of this character whereby shafts can be reliably held in position while being tested for strength; trueness of bearings; while their bearings are being polished, while connecting rods are being fitted to crank shafts, etc.

A further object is to provide a device of this character whereby brake bands can be supported, while the rivets thereof are being cut off preparatory to removing the old brake lining, and whereby said brake bands can be supported while new lining is being riveted thereto.

Other objects will hereinafter appear, and in order that said invention may be fully understood, reference will now be made to the accompanying drawing, in which:

Figure 1 is a front elevation of the device.

Fig. 2 is a side elevation of the device.

Fig. 3 is a plan view of the device with the crank shaft held in position thereon.

In carrying out the invention, I employ a supporting member 1, consisting of a base 2 and an upright portion 3 extending at right angles to said base which is adapted to be secured on top of a work bench by suitable means, such as bolts A. The corner portion of the supporting member 1 is reinforced by a pair of oppositely-disposed marginal flanges 5 and the upright portion 3 has a shoulder 6, projecting from the front side thereof and a shoulder 8 projecting from the rear side thereof. The upright portion 3 also has a pair of shoulders 9 at its opposite edges arranged on a horizontal plane with the upper edge of the shoulder 8 for the purpose of supporting a yoke 11, which coacts with the upright portion 3 and the shoulder 6 in holding crank and transmission shafts and other similar articles, while being operated upon. The forward portion of the yoke 11 has two in-turned terminals 13, adapted to engage the disk B of a crank shaft C, or similar portion of a transmission shaft, and firmly hold the same.

15 designates a set screw threaded through the center of the transverse portion 16 of the yoke and provided with a handle 17, whereby it may be readily rotated. The forward end of the set screw 15 is adapted to abut a reinforcement 18 at the rear of the upright portion 3 of the supporting member 1.

20 designates an anvil adapted to rest upon the shoulder 6 and be firmly held against the face of the supporting member 1 by the yoke 11, which in turn is adapted to be firmly drawn into engagement with the front side of the anvil 20 by the set screw 15. The upper portion 21 of the anvil 20 is segmental in form and provided at its rear side with a marginal flange 22, to prevent brake-bands from slipping backwardly off the anvil. A shoulder 25 on the rear side of the anvil is adapted to rest upon the top of the supporting member 1, and thus coact with the shoulder 6 in relieving the yoke 11 of shock occasioned by blows upon the anvil during the operation of removing or applying rivets to brake bands.

When the device is to be employed in holding a crank shaft or a transmission shaft the anvil 20 is removed and the flange B of the shaft is held firmly against the face of the upright portion 3 of the member 1, by the yoke 11. When thus supported the shaft may be tested for defects of every character, or its bearings may be polished, or connection rods may be fitted to the cranks of the shaft. As the terminals 13 of the yoke 11 grip the flange B of the shaft at diametrically-opposed points there is little or no danger of bending said flange while subjecting the free end of the shaft to lateral pressure for the purpose of determining whether or not such shaft is defective in strength.

From the foregoing description, it is apparent that I have produced a device well adapted for the purposes intended, and while I have shown and described the preferred form of the invention I reserve the right to make such changes in the construction, proportion, and arrangement of parts as properly fall within the spirit and scope of the claims.

Having thus described my invention, what

I claim and desire to secure by Letters Patent, is:

1. In a device of the character described, a yoke, a supporting member consisting of a horizontal base portion and an upwardly-extending portion upon which latter the yoke is adapted to rest, and means bearing against the upwardly-extending portion of the supporting member and adjustably-engaging the yoke to draw the yoke firmly in engagement with a part on the support, for the purpose set forth and described.

2. In a device of the character described, a supporting member having a shoulder on its front side, an anvil adapted to rest upon said shoulder and having a segmental upper surface, a yoke carried by the supporting member and adapted to engage and firmly hold the anvil, and adjustable means carried by the yoke and bearing against the back of the supporting member to draw the yoke firmly in engagement with the anvil.

3. In a device of the character described, a nonadjustable supporting member, a yoke loosely embracing said supporting member and having two inturned terminals adapted to coact with the supporting member in holding articles, and means for adjusting said yoke firmly into engagement with an article to be held between its inturned terminals and the supporting member.

4. In a device of the character described, a rigid supporting member, a yoke extending loosely around the back and sides of said supporting member and having two inturned terminals projecting part way across the face of the supporting member to coact therewith in holding articles, and means for adjusting said yoke firmly into engagement with an article to be held between the inturned terminals and the supporting member.

5. In a device of the character described, a supporting member having shoulders at the sides and rear thereof, a yoke resting loosely upon said shoulders and adapted to coact with said supporting member in holding articles, and a member threaded through the yoke and bearing against the back of the supporting member to adjust said yoke firmly in engagement with an article to be held.

In testimony whereof I affix my signature, in the presence of two witnesses.

RICHARD T. CARLSON.

Witnesses:
FRED C. FISCHER,
L. J. FISCHER.